United States Patent [19]

Hirschel et al.

[11] Patent Number: 4,907,765
[45] Date of Patent: Mar. 13, 1990

[54] WALL WITH A DRAG REDUCING SURFACE AND METHOD FOR MAKING SUCH A WALL

[75] Inventors: Ernst H. Hirschel, Zorneding; Hubert Fleckenstein, Grasbrunn; Peter Thiede, Ganderkesee, all of Fed. Rep. of Germany

[73] Assignee: Messerschmitt-Boelkow-Blohm GmbH, Munich, Fed. Rep. of Germany

[21] Appl. No.: 183,330

[22] Filed: Apr. 7, 1988

Related U.S. Application Data

[63] Continuation-in-part of Ser. No. 911,292, Sep. 24, 1986, abandoned.

[30] Foreign Application Priority Data

Sep. 26, 1985 [DE] Fed. Rep. of Germany ........ 3534293

[51] Int. Cl.$^4$ ............................................. B64C 21/10
[52] U.S. Cl. ..................................... 244/200; 244/130
[58] Field of Search ................ 244/198, 199, 200, 130; 428/167, 156; 264/293

[56] References Cited

U.S. PATENT DOCUMENTS

| | | |
|---|---|---|
| 2,927,022 | 3/1960 | Martin et al. . |
| 3,574,040 | 4/1971 | Chitwood et al. . |
| 3,902,944 | 9/1975 | Ashton et al. . |
| 4,060,016 | 11/1977 | Gerber . |
| 4,320,188 | 3/1982 | Heinz et al. . |
| 4,323,637 | 4/1982 | Chen et al. . |
| 4,430,417 | 2/1984 | Heinz et al. . |
| 4,750,693 | 6/1988 | Lobert et al. ........................ 241/200 |

FOREIGN PATENT DOCUMENTS 250948 1/1988 European Pat. Off. .
1923633 12/1970 Fed. Rep. of Germany .
3034321 8/1980 Fed. Rep. of Germany .

OTHER PUBLICATIONS

Research & Development, Mar. 1984, pp. 74–75.
AIAA'83, AIAA-83-0227, "Turbulent Drag Reduction of External Flows" D. M. Bushnell, NASA Langley Research, Jan. 10–13, 1983.
Deutsche Normen, May 1976, DIN 61 850.
NASA Tech Briefs, Summer (1980), "Grooves Reduce Aircraft Drag" M. J. Walsh, Langley Research Center.
Mikromechanik aus Silizium by James B. Angell et al., Spektrum der Wissenschaft, Jun. 1983, p. 40.
Lasertechnic, an Introduction by W. Brunner et al., published by Dr. Alfred Huechtig, 1984.
Laser und Optoelektronik, Nr. 1, 1986, by H. Vogt et al., p. 49.

Primary Examiner—Galen Barefoot
Attorney, Agent, or Firm—W. G. Fasse; D. H. Kane, Jr.

[57] ABSTRACT

A wall having a surface in contact with a fluid, has a surface configuration which reduces drag if there is relative movement between the surface and the fluid. The wall is made of metal or of fiber composite material in such a way that sharp edged or fine ridges and grooves between the ridges are formed as integral surface components of the wall structure for simplifying the construction, reducing the weight, and increasing the useful life of structures having such walls.

37 Claims, 2 Drawing Sheets

WALL WITH A DRAG REDUCING SURFACE AND METHOD FOR MAKING SUCH A WALL

This application is a continuation-in-part of application Ser. No. 911,292, filed Sept. 24, 1986, now abandoned.

FIELD OF THE INVENTION

The invention relates to a wall with a drag reducing surface and to methods for making such a wall. Walls of this kind are useful for structural components which are exposed to a relative movement between a fluid and the structural component. Aircraft, spacecraft, watercraft, and land vehicles, for example railway cars, especially magnetically levitated railway cars, may have such walls. Fluid ducts may also have such walls.

DESCRIPTION OF THE PRIOR ART

It is known to provide surfaces which are exposed to a relative motion between the surface and a fluid with a drag reducing groove configuration. German Patent Publication (DE-OS) 3,034,321, for example, discloses the formation of two line systems which cross each other on the surface of such a wall component. The two line systems are slanted at an angle relative to the direction of movement. These line systems form grid type elevations on the structural surface. The line system and the wall itself are separate structures and the line system must be attached to the wall surface. For example, separate foils, such as metal foils, may be pressed to have the line configuration. The pressed foils are then attached to the wall surface by an adhesive. Such foils are not very erosion resistant and must be replaced frequently. Replacement is cumbersome and time consuming because all the old adhesive must be removed before a new foil can be attached.

A publication AIAA-83-0227, entitled "Turbulent Drag Reduction For External Flows" by Bushnell, published by the American Institute of Aeronautics and Astronautics, describes on page 6 and shows on page 18 various riblet configurations for drag reduction purposes. Bushnell also proposes to extrude thin films having the required riblet configuration through dies and then attaching these thin films to the aircraft surface by an adhesive. The problems with thin films are the same as with metal foils. Frequent replacements are necessary and deterioration is even more pronounced for thin films than for foils because the utraviolet radiation, to which aircraft and spacecraft are especially exposed, deteriorates the thin films more than it does metal foils..

Bushnell discloses on page 18 peak to peak spacings between neighboring riblets in the range of 0.25 mm to 3.15 mm where the riblets are formed by symmetric V-grooves. Where the riblets are formed by curved peaks and curved valleys the spacings are within the range of 0.1 to 0.7 mm. A curved peak and curved valley riblet configuration has been found to have an unsatisfactory drag reduction. Further, the teaching of Bushnell that the height and spacing of the grooves must be in the order of the individual wall streak dimensions shows that those skilled in this art have not recognized the possibilities of further significant improvements. According to the invention the riblet dimensions must be smaller than has been conventionally recognized, as will be explained below.

NASA Tech Briefs, Vol. 5, Nr. 2, Summer 1980, page 192 (M. J. Walsh) shows riblets having spacings at least 0.254 mm. It has been found that these spacings are too large to be efficient. Besides, Walsh teaches that the grooves should be machined in the aircraft skin. Such machining by milling tools is not possible for the dimensions claimed herein.

U.S. Pat. No. 3,902,944 (Ashton) teaches making an aircraft component, such as a wing, of fiber composite material. There are no drag reducing features disclosed in this reference.

German Patent Publication (DE-OS) 1,923,633 discloses attaching a fur or pelt type member to the surface of a structural component in order to influence the boundary layer. The fur type or pelt type member may be a self-adhesive film which is glued or adhesively bonded to the wall surface of the structural component such as an aircraft body or wing.

The conventional teaching of manufacturing the drag reducing surface component as a separate metal foil or as a thin film and to then attach the foil or film to the surface by an adhesive, substantially increases the number of man hours and hence the construction expenses. Additionally, the drag reducing surface components add to the weight of the structure to which the surface components are attached. Another disadvantage of the prior art is seen in that the foil or film material is very erosion and damage prone, e.g., due to fine particles in the air through which an aircraft is flying. Even ice particles may become very abrasive for the foils and films at the high speeds involved. Thus, these foils and films have a substantially reduced useful life. Therefore, the initially separate drag reducing grooved surface components must be frequently completely removed each time when they are damaged and must be replaced by new respective surface components which is an extensive and time consuming procedure.

OBJECTS OF THE INVENTION

In view of the foregoing it is the aim of the invention to achieve the folowing objects singly or in combination:

to provide a wall with a drag reducing surface and a method for making such a wall in which the drag reducing characteristics, namely the grooves and the ridges between adjacent grooves, form an integral component of the wall structure itself to avoid the above mentioned disadvantages such as additional labor and increased weight;

to make these grooves and ridges flow dynamically optimally efficient, yet mechanically resistant to wear and tear;

to construct the wall surface in such a way that the drag reducing ridges and grooves result automatically from the wall formation in a mold so that any additional labor is completely avoided and so that weight is not added to the wall structure while simultaneously increasing the useful life of the wall structure;

to make the wall structure of fiber composite material which, prior to curing, is so treated that after curing the sharp or fine edged ridges and grooves are an integral part of the wall structure;

to make the wall structure of metal and to form the sharp edged or fine ridges by removing material between the ridges to form grooves by fine or microetching techniques or by burning with a laser beam; and to construct the fine or sharp edged ridges and grooves so that their surface is erosion resistant.

SUMMARY OF THE INVENTION

According to the invention, there is provided a wall having a drag reducing surface configuration to be contacted by a fluid, comprising a wall structure with sharp edged ridges separated by valleys forming an integral part of said wall structure, said sharp edged ridges having an on-center ridge spacing s within the range of about 0.025 mm$\leq$s$\leq$0.25 mm, said valleys having a depth d within the range of about 0.5 s$\leq$d$\leq$2.0 s, whereby the depth d and the ridge spacing are interdependent.

Where the wall surface is made of metal, the fine or sharp edged ridges are formed according to the invention by using microchip fine etching techniques or laser beam burning techniques for removing the material from the grooves.

According to the invention there is further provided a wall having a drag reducing surface configuration which is characterized in that the wall is made of fiber composite material and has a surface in which ridges and grooves form an integral part of the fiber composite material as a result of the formation of the wall by the layering, or by the surface treatment, or by the winding technique of the fiber composite material. Preferably, the fiber composite materials are applied to a support wall structure by layering, so that fiber reinforcing material layers have a unidirectional fiber orientation, whereby the fibers may be endless fibers and whereby the matrix material is recessed relative to fibers at the very surface so that the ridges and grooves are formed, or so that the ridge and groove zones are formed.

The fiber compound material may also comprise short fibers for reinforcing the resin matrix material, whereby the short fibers may be oriented in accordance with the desired ridge and groove configurations. Fiber rovings having an endless fiber structure are suitable for the present purposes, whereby these rovings, or at least the surface forming roving is so treated that the matrix material is recessed relative to the fiber surface.

The optimal value $s_{opt}$ for the on-center ridge spacing "s" between neighboring sharp or fine edged ridges is ascertained according to the invention by the following relationship:

$$s_{opt} \approx d \approx (12 \text{ to } 15) \, s^*,$$

wherein: the factor 12 to 15 represents experience values;

wherein: $s^*$ is a characteristic length or so-called "wall unit"

$$s^* = \frac{\nu}{w_T};$$

wherein: $\nu$ is the kinematic viscosity of the fluid in contact with the wall surface;

wherein $w_T$ is the shearing stress velocity $w_T =$ $$\sqrt{\frac{\tau_w}{\rho}};$$

wherein $\rho$ is the density of the fluid; and wherein p96 $_w$ is the wall shearing stress at a smooth surface not provided with a ridge and groove microstructure according to the invention, but caused by the local velocity w.

According to the foregoing teaching of the invention the ridge spacing s is preferably smaller than or only about 50% of the wall streak dimensions corresponding to approximately 30 wall units $s^*$. With this teaching the drag reduction has been found to be 100% better than has been achieved by D. M. Bushnell. In other words, where Bushnell achieves up to 10% drag reductions, the invention achieves a reduction of about 20% of the turbulent drag, which is an unexpected result.

BRIEF DESCRIPTION OF THE INVENTION

In order that the invention may be clearly understood, it will now be described, by way of example, with reference to the accompanying drawings, wherein:

FIGS. 1a to 1e show five sectional views, on an enlarged scale, of a wall structure made of fiber composite material, and having an integral ridge and groove configuration in its surface; and FIGS. 2a to 2h show different orientations of the ridges and grooves or valleys in the wall surface, whereby the view direction is shown by the arrow A in FIG. 1a.

DETAILED DESCRIPTION OF PREFERRED EXAMPLE EMBODIMENTS AND OF THE BEST MODE OF THE INVENTION

The terms "valley" and "groove" are used as synonyms herein. As mentioned above, the application of a microstructure of valleys or grooves and ridges on the surface of a wall exposed to a relative motion between the wall and a fluid, reduces the frictional drag along turbulent boundary layers. In fact, the reduction can amount to at least 10% as compared to a wall structure without such microsurface configuration. Accordingly, such groove and/or ridge structures also referred to as microsurface structures, are important with regard to savings of energy and hence they are economically important. Such surface microstructures are advantageous on all surfaces that are exposed to a relative movement between the surface and a fluid. The advantage is particularly important in systems which are subject to fluid flow caused stress, for example in aircraft, water and land vehicles, and so forth. The advantageous effect, however, also occurs in systems in which the wall surface is stationary and a fluid flows along the wall, for example in gas and liquid conveying systems such as pipelines and the like. The advantageous effect is also achieved in air inlet flow systems and jet flow systems.

The frictional drag is particularly significant in all those instances where the relative speed between the wall surface and the fluid is substantial, because in these instances the drag also results in a higher mechanical stress of the surface.

Relatively recent tehhnologies are employed to make support structures and the walls thereof out of fiber composite material in addition to making such walls with flow dynamic microsurface structures of metal. It is also known to make aircraft wings, aircraft bodies, shells, and containers, as well as pipes and so forth of fiber composite material. The invention suggests to provide such structures with a microsurface configuration which forms an integral part of the fiber composite material. In other words, the grooves and the fine or sharp edged ridges are formed simultaneously with the manufacture of these components. The teaching of the invention may be employed for thermosetting plastic materials such as CFK, GFK, SFK, and also in connection with ceramic material, as well as fiber ceramic materials. The invention is also applicable where thermoplastic materials reinforced by fiber inserts are employed. The thickness of the filaments or reinforcing fibers assures the required edge sharpness of the ridges separating adjacent grooves.

The above mentioned fiber composite materials also known as FVW materials comprise fiber reinforcing layers arranged with a unidirectional orientation of the fibers on the structural surface with the fibers embedded in a matrix material. Such matrix material may be somewhat recessed at the surface to form the grooves between ridges formed by the parallel fibers.

FIG. 1a shows an embodiment with uniform on-center spacings s between adjacent fine edged ridges R1 and R2 so that grooves G1 are formed between adjacent ridges. The grooves G1 have a substantially semicircular, concave configuration or crosssection with a radius of curvature D such that the semicircular concave curve reaches all the way to the fine edge of the ridge. This feature results in especially fine edged ridges which have been found to be particularly efficient in the drag reduction if they are dimensioned as taught by the invention.

In all the embodinments shown in FIGS. 1a to 1e, the following condition applies: $0.025 \leq s \leq 0.25$ mm, and the groove depth d is within the range of $0.5s \leq d \leq 2.0s$.

The just described configurations of the grooves and ridges are formed simultaneously with the formation of the wall W itself, for example, by a respective formation of the tool surface onto which the fiber composite material is layered. Another possibility involves treating the surface, preferably after a partial curing. This possibility involves a mechanical surface treatment such as sandblasting for removing a small proportion of the matrix material between adjacent fibers forming the ridges. Yet another possibility involves a surface shaping after a winding operation, but during the curing. The materials used may be so-called fiber composite prepregs.

Figure 1A:
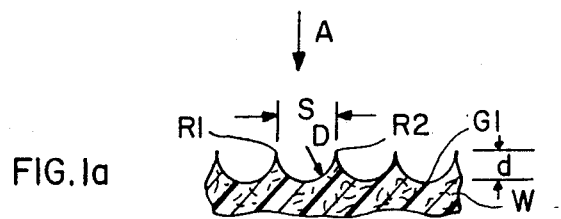
FIG. 1b shows sawtooth ridges R3 between adjacent grooves G2 having a flat bottom.
FIG. 1c shows sawtooth ridges R4 between adjacent grooves G3, also having a sawtooth configuration, however, an inverted sawtooth configuration relative to the ridges R4.
FIG. 1d shows a sawtooth configuration with a vertical wall and a slanted wall forming the ridges R5 between adjacent grooves G4.
FIG. 1e shows a combination of crescent shaped grooves G5 alternating with V-shaped grooves G6 forming sharp edged ridges R6.
Figure 1B:
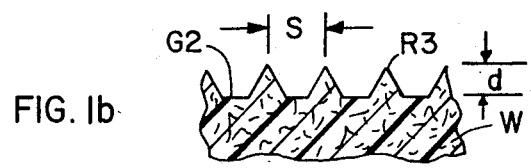
Figure 1C:
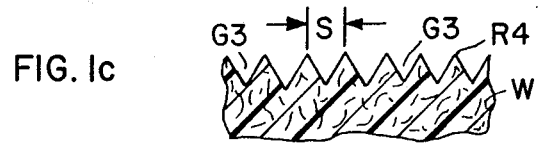
Figure 1D:
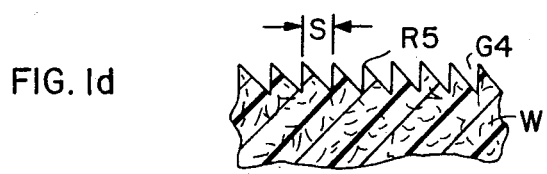
Figure 1E:
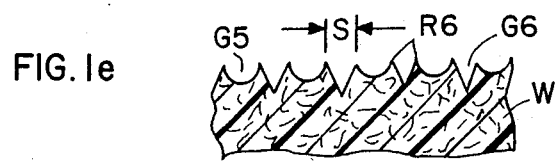

FIGS. 2a to 2h show different views in the direction of the arrow A of FIG. 1a. In these configurations a reinforcing layer of short fibers having a length in the range of about 0.1 μm to 3 mm is placed on the surface of the wall as part of the layering or winding operation to form so-called groove and ridge zones. The reinforcing layers of fibers in the resin matrix material may be layered prepregs, or the so-called SMC-technique may be employed in the wall formation.

Figure 2A:
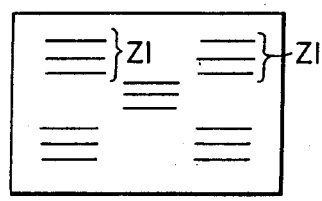
Figure 2B:
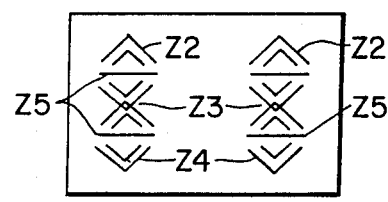

FIG. 2a shows, for example, five zones Z1 of grooves and ridges, all of which are oriented in a unidirectional manner and in parallel to each other, however, with a staggering between the zones as shown. FIG. 2b shows ridge and groove zones Z2, Z3, and Z4. The ridges and grooves in the zones Z2, Z3, and Z4 extend at an angle relative to the symmetrical, parallel zones Z5.

Figure 2C:
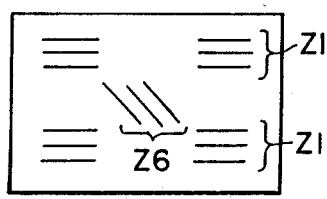

In FIG. 2c a slanted zone Z6 of ridges and grooves extends at an angle of about 45° relative to zones Z1. Additionally, the zone Z6 is staggered relative to the zones Z1.

Figure 2D:
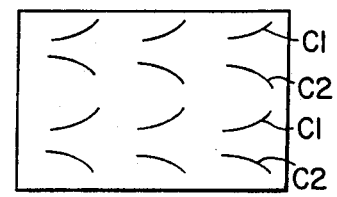

FIG. 2d shows an embodiment in which the grooves and ridges form curved configurations which are, for example, symmetrically distributed over the surface, and which are suitable to function as turbulence generators.

Figure 2E:
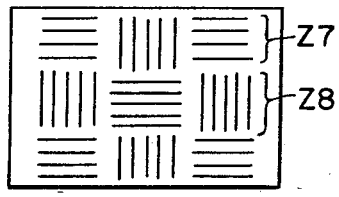

In FIG. 2e the zones Z7 extend at right angles toto zone Z8 whereby a symmetrical checkerboard type of zone distribution is achieved.

Figure 2F:
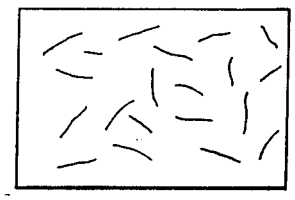

FIG. 2f illustrates a random distribution of the ridges and grooves, whereby each of the short lines represents a groove bordered by its two ridges. Incidentally, this also applies to all the other illustrations of FIG. 2.

Figure 2G:
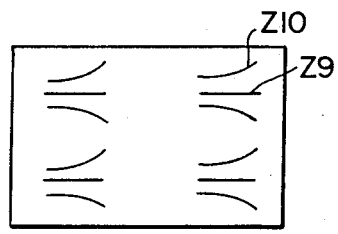

In FIG. 2g straight zones Z9 are flanked by curved zones Z10, whereby these zones are symmetrically distributed over the surface.

Figure 2H:
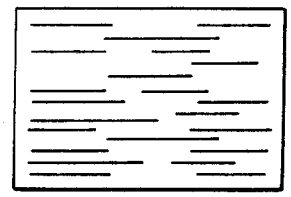

FIG. 2h shows several ridge and groove zones of random length and of random distribution over the surface, however, all of the zones extend in parallel or approximately in parallel to each other.

In all the embodiments in which the ridge and groove zones extend in parallel, or at least approximately in parallel, to each other the condition prevails that $s \leq s^*$ (mm) applies.

The fiber composite materials may have an endless fiber structure, for example, in the form of fiber rovings, whereby the binding of the webbing may, for example, be made in accordance with the German Industrial Standard Sheet DIN 61850. Well known atlas type bindings, linen bindings, twill type bindings, and combinations of these bindings may be exployed in the fiber reinforcing webbing. In any of these webbings the matrix material will be recessed from the top fibers to form the described grooves.

The above employed abbreviations are explained as follows.

CFK is carbon fiber reinforced composite
SFK is special fiber reinforced composite
FVW is fiber reinforced plastic
SMC means sheet molding compound
S* mcans as defined in claim number 5.

The invention provides an effective erosion protection against fine particles which may impinge on an aircraft surface during flight, for example ice particles and the like, by exposing the fibers in the surface of the fine or sharp edged ridges and valleys or providing the grooved metal surface with a protective oxide coating, such as aluminum oxide. Further, where the fibers are embedded in synthetic resin material, highly erosion resistant powders may be mixed into the synthetic resin material prior to the embedding of the fibers in the material. Such powders may also be embedded in the surface of the ridges and valleys. The fibers may be glass fibers and/or carbon fibers, for example, which have a sufficient hardness and strength to provide a good erosion protection. The fibers, including the short fibers, have the further advantage that they reinforce the ridges or ribs in such a way that in spite of their thin walled and sharp edges there are no problems when removing the cured wall structure from a mold. The fibers may also be made as metal fibers of aluminum or titanium or alloys of these metals. All fibers have a diameter in the range of 0.1 to 1.0 μm. and in the case of the short fibers, they may have a length in the range of 1.0 μm to about 3 mm. The reinforcing powder mentioned above, may be selected from any one or a combination of emery, silicon carbide, and tungsten carbide, whereby the grain diameter may again be in the range of 0.1 to 1.0 μm. The powder is mixed with the matrix material so that the powder becomes embedded in the matrix material.

Where the fine edged ridges and valleys are formed by a microchip etching technique or by burning with a laser beam in a metal surface made of aluminum or alloys of aluminum, including zinc, copper or lithium, the so formed surface will then be anodized to provide an oxide layer for increasing the erosion resistance.

Where the reinforcing fibers are carbon fibers, an especially good protection against deterioration by ultraviolet radiation has been achieved, particularly when the carbon fibers are mixed into the synthetic resin matrix material in the form of short fibers having the above mentioned length.

Sharp edged ridges as claimed herein may also be formed in metal surfaces made of titanium, whereby again the very fine or sharp edged ridges can be formed by the above mentioned microchip type etching technique or by burning with a laser beam. Optically produced etching masks can be used according to the invention for achieving the very fine dimensions of the ridges and valleys. Heretofore, it was not possible to machine such fine dimensions in a metal surface with the aid of mechanical milling cutters.

The teachings according to the invention for the first time make it possible to economically produce flow dynamic surfaces with the very fine dimensions required for an efficient drag reduction, while simultaneously assuring a practically feasible resistance against erosions in spite of the extremely fine dimensions of the ridges and valleys, against the effects of particles suspended in the air, including ice crystals and the like while also providing protection against ultraviolet radiation.

The radius D of curvature of the valleys between the ridges should be such that flat wall portions are avoided altogether. Preferably, D is within the range of 0.5 $s \leq D \leq s$. When D becomes equal to s the valley depth d will be small.

According to the invention the groove structures can be manufactured in different ways. For example, photolithographic methods may be employed. In the latter method a light sensitive film is applied to the work piece surface such as a fuselage wall section. The light sensitive film may, for example, be a polymer which is then covered with a photo-mask representing an image of the groove structure. The image will be a plurality of light and dark lines, for example, or zones. After the mask has been applied, the light sensitive film will be exposed through the mask to cause a curing in the exposed zones. Thereafter, the non-exposed zones are washed away. The resulting, or rather remaining, ridges of cured polymer may themselves form the groove structure or they may form a mask for a subsequent etching operation. In this way it is possible to apply groove structures on a shining metal surface or the metal surface may first have been covered with a lacquer. The groove structure or the ridge structure may be reinforced by embedding in the polymer the above mentioned reinforcing fibers and/or powders as will be mentioned in more detail below.

Polymeric materials suitable for the present purposes are disclosed in U.S. Pat. Nos. 2,927,022; 4,320,188; 4,323,637; or 4,430,417.

Another possibility of forming the groove or ridge structure according to the invention is accomplished with the aid of a laser beam which is guided back and forth along the surface of the structure to form the valleys and ridges. Guiding the laser beam generator can be accomplished with any suitable numerically controlled machine tool. For example, U.S. Pat. No. 3,574,040 discloses an apparatus suitable for manufacturing laminated structural components by a controlled deposition and polymerization of tectonic fiber belts or tapes. The known machine tool is essentially a four-axis portal type of robot in which the machining head is numerically controlled for performing the motions in the required x, y, and z directions and the work piece carrier is tiltable about the z-axis. U.S. Pat. No. 4,060,016 discloses another portal robot numerically controlled for movement along three axes. The stamping tool merely needs to be replaced by a laser beam generator, whereby the beam generator should be tiltable about two axes which extend at right angles to each other and in parallel to the x-y plane. Controls for such tiltability are known in the art. Parameters such as the feed advance speed, the laser beam intensity, the spacing between the laser generator output, and the work piece surface, and the like, can be programmed in a conventional way. Such an apparatus is essentially a portal robot having five axes or movement directions of which three axes relate to linear movements, while two axes relate to rotational movements. Thus, any desired pattern for the laser beam movement can be programmed, whereby the beam direction may even extend at an angle to the surface plane of the work piece. The laser beam may be used to locally apply material to the surface of the work piece. Known photolithographic methods may be employed to form masks in preparation of an etching step as is known, for example, in connection with the manufacture of silicon chips for integrated circuits. The above mentioned photosensitive or light sensitive film may be exposed by ultraviolet light, whereby the photosensitive layer may be of the negative or positive type. When a positive type film is used, the zones exposed to the ultraviolet radiation will be softened. If the film is of the negative type, the zones will cure and harden. According to the invention, a negative photosensitive layer, for example of a polymer, will be applied to the surface of the work piece and the layer is then hardened in accordance with a desired pattern by an ultraviolet laser beam moved back and forth along the work piece surface with the aid of a five axis portal robot as described above. The zones which shall become ridges are exposed by the ultraviolet laser beam, whereby the respective material hardens. After complete hardening, the nonhardened portions are washed out, for example, with a developer liquid. Reference is made in this respect to "Spektrum der Wissenschaft" June 1983, page 40, disclosing an article "Mikromechanik aus Silizium" by James B. Angell et al. This method has the advantage that the ridge structure can be formed on a shiny metal surface as well as on any synthetic material surface. In other words, the groove and ridge structure may also be formed on lacquered metal surfaces. If such surfaces should require repair, it is quite easy to remove the worn areas by a solvent for the hardened polymer. After removal, new ridges and grooves may be applied as described above. The selection of materials including the materials forming the work piece will be such that the selected solvents will not attack the work piece surface.

In order to increase the resistance of the ridge and groove structure against erosion, the above mentioned fibers and powders should be embedded in the polymeric material. The erosion increasing materials are, for example, glass fibers and/or powders, whereby glass has the important advantage that it does not impede the above described ultraviolet light exposure since the glass is transparent. Accordingly, the curing or hardening of the material is also not impaired by the addition of glass powders and/or fibers. The glass powder or fibers should have dimensions within the range of 0.1 to 1.0 μm.

A laser beam may also be employed in connection with a microetching operation for producing the groove and ridge structure. Here again, masks are applied to the surface to be etched, whereby the masks make sure that the etchant can reach only those surface areas where the valleys are to be formed in the surface. Here again, the above described photolithographic method may be employed for the formation of the mask and the above mentioned photosensitive materials of the positive or negative type may be used, whereafter the etching mask is exposed with a laser light source carried by a five axis portal robot to form, for example patterns as shown in present FIGS. 2a to 2h. The etching and the materials used therein are well known. In the just described method the grooves are worked directly into the metal surface.

A laser beam may also be used for removing material directly out of the metal surface. The laser beam must have an energy output sufficient for this purpose, namely, to form a hot plasma on the material surface. The hot plasma absorbs the laser light and applies the energy to the material surface. An auxiliary gas jet, for example of oxygen, may be employed to further increase the temperature due to the oxidation heat, whereby the machining operation speed can be substantially increased. The molten metal may be effectively removed from the respective groove or valley by blowing the molten material out of the groove or valley with a gas jet. European Patent Publication 0,250,948 describes a microvalve suitable for producing such a blowing jet. The microvalve and the laser light source would be transported by a five axis portal robot as described above. Lasers suitable for the present purposes are described in a book "Lasertechnic, An Introduction," by W. Brunner and K. Junge, published by Dr. Alfred Huechtig, (publisher), 1984. This book also discloses further numerically controlled devices for laser applications.

Material for the formation of the groove and ridge structure may also be removed with a laser beam of less power output, whereby these ridges and valleys are "burned into" the lacquer layer on the surface of an aircraft. The conventional thickness of these lacquer layers corresponds to approximately 50 μm. Thus, grooves having a depth d of 20 μm may be manufactured without problems. In zones where deeper valleys or grooves are required, the lacquer layer may be initially applied to the required larger thickness. This method has the advantage that the strength of the supporting metal structure of the aircraft components such a the fuselage is not diminished. The renewal of such a groove and ridge structure is also very simple since it merely requires cleaning the worn grooves and closing the worn grooves with a new lacquer layer, whereupon the new groove structure is formed by the laser beam as described above.

The physcial utilization of a laser beam as is presently known in the production of microchips may also be suitable for present purposes. Reference in this respect is made to "Laser and Optoelectronic", Nr. 1, 1986, page 49. Basically, the thermal effects of a laser beam are utilized for the formation of the desired surface configuration.

Although the invention has been described with reference to specific example embodiments, it will be appreciated, that it is intended to cover all modifications and equivalents within the scope of the appended claims.

What we claim is:

1. A wall having a drag reducing surface configuration to be contacted by a fluid, comprising a wall structure made of fiber composite material including reinforcing fibers embedded in a resin matrix material, said wall structure having sharp edged ridges separated by valleys, and wherein said resin matrix material is recessed in said valleys so that said fibers extend into said sharp edged ridges and are at least partially exposed at least along said ridges for an increased resistance against wear and tear.

2. The wall of claim 1, wherein said valleys have been formed by micro etching.

3. The wall of claim 1, wherein said valleys have been formed by burning with a laser beam.

4. The wall of claim 1, wherein said ridges and valleys have been formed by pressing a respective mold into the surface of said fiber composite material when the fiber composite material is still uncured and then curing said fiber composite material to harden said wall structure including said ridges and valleys forming an integral part of said wall structure.

5. The wall of claim 1, wherein said fibers are endless fibers arranged in layers.

6. The wall of claim 5, wherein said endless fibers are arranged as fiber rovings.

7. The wall of claim 1, wherein said fibers are short fibers having a fiber orientation substantially in parallel to said sharp edged ridges.

8. The wall of claim 7, wherein said short fibers have a length within the range of about 1.0 μm to about 3.00 mm, and a diameter of about 0.1 μm to about 1.0 μm.

9. The wall of claim 1, wherein said matrix material is a synthetic resin having embedded therein, in addition to the reinforcing fibers, a powder of an erosion resistant material including emery, silicon carbide, and tungsten carbide singly or in combination.

10. The wall of claim 9, wherein said powder has a grain diameter in the range of 0.1 μm to 1.0 μm.

11. The wall of claim 1, wherein said matrix material is a synthetic resin and wherein said fibers are made of glass and/or carbon.

12. The wall of claim 1, wherein said mairix material is a synthetic resin, and wherein said fibers are metal fibers made of aluminum, titanium, or an alloy thereof, said metal fibers being embedded in said synthetic resin matrix and atleast partially exposed along said valleys and along said sharp edged ridges.

13. The wall of claim 11, wherein said metal fibers have an anodized oxide coating on their fiber surface.

14. The wall of claim 1, wherein said valleys have a radius D of curvature such that a concave curve forming each valley reaches all the way to the neighboring sharp edged ridges, thereby avoiding flat wall portions.

15. The wall of claim 1, wherein said valleys and sharp edged ridges are arranged in zones in which the valleys and ridges extend in parallel to each other and in the same direction.

16. The wall of claim 15, wherein said zones are staggered relative to each other.

17. The wall of claim 1, wherein said valleys and sharp edged ridges are arranged in zones, and wherein certain zones extend at an angle relative to other zones extending in parallel to each other.

18. The wall of claim 1, wherein said valleys and sharp edged ridges are arranged in zones, and wherein certain zones extend at an angle of about 45° relative to other zones.

19. The wall of claim 18, wherein the valleys and sharp edged ridges within each zone extend in parallel to each other.

20. The wall of claim 1, wherein said valleys and sharp edged ridges have curved configurations.

21. The wall of claim 1, wherein said valleys and sharp edged ridges are arranged in zones with the valleys and ridges extending in parallel to each other within each zone but at right angles relative to neighboring zones to form a checkerboard type zone distribution.

22. The wall of claim 1, wherein said valleys and sharp edged ridges have a random distribution on said wall structure.

23. The wall of claim 1, wherein said valleys and sharp edged ridges are arranged in first zones with straight valleys and ridges and second zones with curved valleys and ridges.

24. The wall of claim 23, wherein at least one first zone is flanked by at least one second zone on each side of said first zone.

25. The wall of claim 23, wherein said first and second zones are symmetrically distributed over the surface of said wall structure.

26. The wall of claim 1, wherein said valleys and sharp edged ridges have random lengths.

27. The wall of claim 26, wherein said valleys and sharp edged ridges of random lengths have a random distribution over the surface of said wall structure.

28. The wall of claim 26, wherein said valleys anbd sharp edgerd ridges of random lengths extend appropriately in parallel to one another.

29. The wall of claim 26, wherein said valleys and sharp edged ridges overlap one another laterally at least partly.

30. A method for making a wall having a drag reducing surface to be contacted by a fluid, comprising the following steps:
 (a) providing a mold having a mold surface with sharp edged ridges separated by valleys in said mold surface,
 (b) placing preimpregnated, but not yet fully cured fiber composite material into said mold so as to uniformly contact said mold surface with said fiber composite material, and so that reinforcing fibers are exposed on the surface of said fiber composite material at least along said sharp edged ridges on said mold bottom, whereby the resulting drag reducing surface has said reinforcing fibers exposed in said sharp edged ridges,
 (c) applying compression between said fiber composite material and said mold surface sufficiently to form sharp edged ridges and valleys in said drag reducing surface, and
 (d) curing said fiber composite material in said mold and removing said wall from said mold.

31. The method of claim 30, wherein said step of placing said fiber composite material into said mold is performed in such a manner that said reinforcing fibers are exposed also along said valleys.

32. The method of claim 30, comprising preparing said fiber composite material by mixing an erosion resistant powder of emery, silicon carbide and tungsten carbide singly or in combination into a synthetic resin for forming a matrix material and then embedding reinforcing fibers in said matrix material and so that the fibers along said sharp edged ridges are exposed on the surface of said matrix material.

33. A method for making a wall having a drag reducing surface, comprising the following steps:
 (a) forming a wall structure having said drag reducing surface of fiber composite material having reinforcing fibers embedded in a resin matrix material,
 (b) locating said fibers in said matrix material by layering at least surface forming fibers so that said sharp edged ridges are formed by said surface forming fibers which are thus exposed at least along said sharp edged ridges,
 (c) shaping, prior to curing of said resin matrix material, in said surface of said wall structure a surface configuration comprising sharp edged ridges spaced by valleys,
 (d) and curing said resin matrix material, whereby said sharp edged ridges and valleys become an integral part of said wall structure as a result of said shaping.

34. The method of claim 33, wherein said surface forming fibers are also exposed along said valleys.

35. The method of claim 33, wherein said step of shaping said surface configuration comrpises treating said surface of said fiber composite material so that said valleys result between said sharp edged ridges.

36. The method of claim 35, wherein said treating step involves removing matrix material from and partially between fibers at said surface.

37. The method of claim 33, wherein said step of shaping said surface configuration comprises winding said reinforcing fibers in such a way that said sharp edged ridges and valleys are formed in said drag reducing surface.

* * * * *

UNITED STATES PATENT AND TRADEMARK OFFICE
CERTIFICATE OF CORRECTION

PATENT NO. : 4,907,765

DATED : March 13, 1990

INVENTOR(S) : Ernst H. Hirschel, Hubert Fleckenstein, Peter Thiede

It is certified that error appears in the above-identified patent and that said Letters Patent is hereby corrected as shown below:

In Column 4, line 10, "BRIEF DESCRIPTION OF THE INVENTION" should be --BRIEF DESCRIPTION OF THE DRAWINGS--.

In Claim 12, line 1, "mairix" should be --matrix--;
line 5, "atleast" should be --at least--.

In Claim 13, line 1, "claim 11" should be --claim 12--.

In claim 28, line 1, "anbd" should be --and--;
line 2, "edgerd" should be --edged--, "appropri-" should be --approxi- --;
line 3, "ately" should be --mately--.

In claim 35, line 2, "comrpises" should be --comprises--.

Signed and Sealed this

Nineteenth Day of March, 1991

Attest:

HARRY F. MANBECK, JR.

*Attesting Officer*   *Commissioner of Patents and Trademarks*